UNITED STATES PATENT OFFICE.

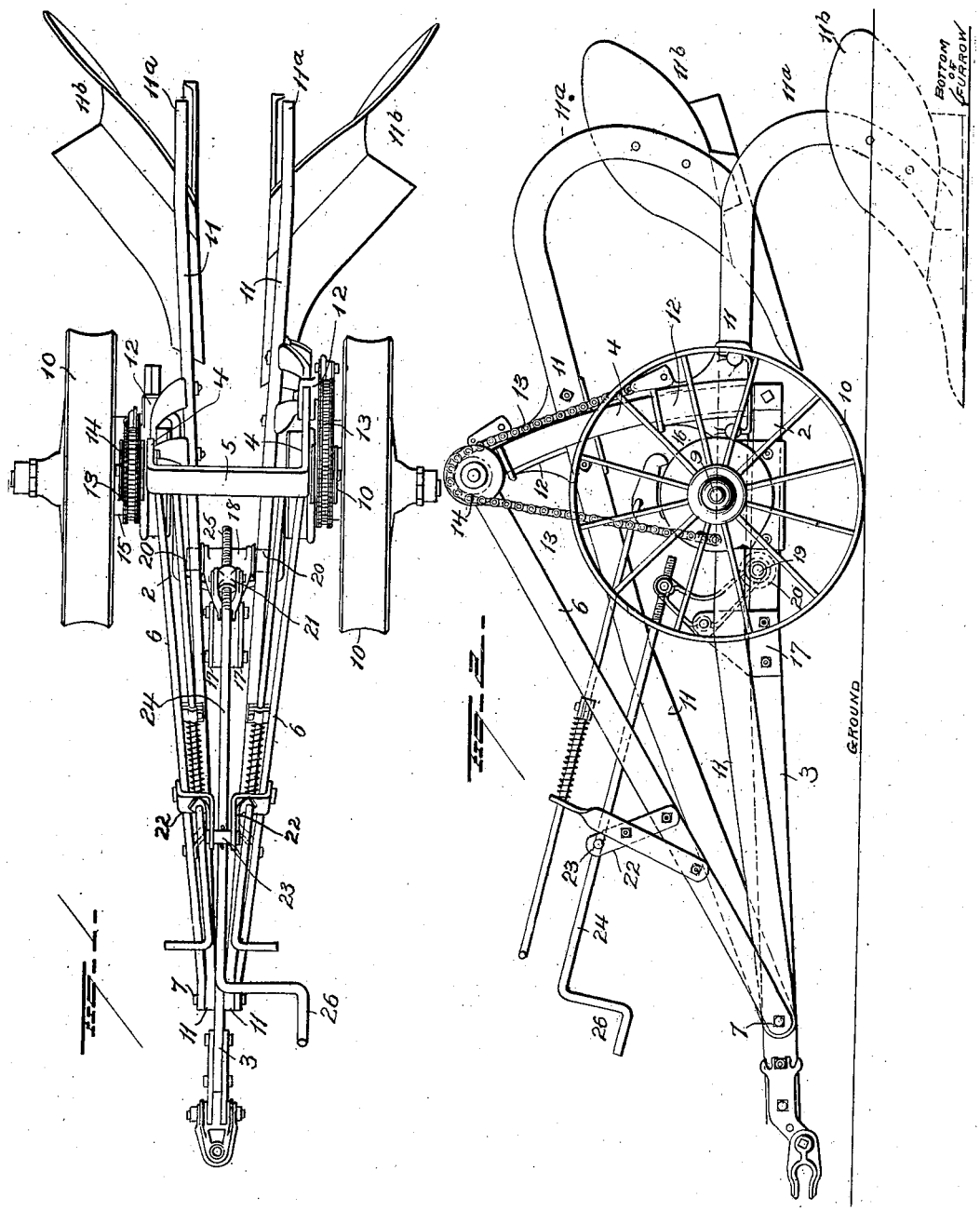

RUDOLPH J. ALTGELT, OF SOUTH BEND, INDIANA, ASSIGNOR TO OLIVER CHILLED PLOW WORKS, OF SOUTH BEND, INDIANA.

PLOW.

1,377,048.   Specification of Letters Patent.   Patented May 3, 1921.

Application filed March 17, 1920. Serial No. 366,618.

*To all whom it may concern:*

Be it known that I, RUDOLPH J. ALTGELT, a citizen of the United States, and a resident of South Bend, in the county of Saint Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to such as are known in the art as "two-way" plows,— one object of the invention being to provide simple and efficient means for adjustably supporting one or the other plow beam in working position.

A further object is to so construct and arrange the adjustable supporting means, that the same shall be common to both beams of a two-way plow so that the depth of plowing of each plow may be accurately adjusted, and to so mount such means in a two-way plow having wheel-operated power lift mechanism, that when either plow, when in elevated position, shall have been released, it will drop upon said supporting and depth adjusting means, and the same depth of plowing for the two plows will be insured.

With these and other objects in view, the invention consists in certain novel features of construction and combinations of parts as hereinafter set forth and pointed out in the claims.

In the accompanying drawings, Figure 1 is a plan view of a two-way plow showing an embodiment of my invention, and Fig. 2 is a side elevation of the same.

1 represents a wheeled frame comprising a rear portion 2; a forwardly extending central frame member 3; segmental upright members 4 secured to the rear frame portion 2 and connected by a cross bar 5, thus forming an arch, and diagonal brace members 6 extending forwardly and downwardly from the upper ends of the segmental members 4 to the forward portion of the central frame member 3, where they are secured by a bolt 7. Brackets 8 are secured to the side portions of the rear frame portion 2 and to these brackets, axle sections 9 are secured for the accommodation of ground wheels 10. The forward ends of plow beams 11 are pivoted on the bolt 7 and to the standard portions 11$^a$ at the rear ends of said beams, plow bases 11$^b$ are secured,—the respective bases being disposed reversely with relation to each other as is customary with two-way plows.

Tubular guides 12 are secured to the respective plow beams and are movable on the segmental frame members 4. Chains 13 are connected with the tubular guides 12 and, after extending upwardly over wheels 14 at the upper ends of the segmental frame members 4, these chains are extended downwardly and are secured to drums 15 associated with the wheels. These drums are adapted to be locked to the wheels by means of clutch mechanism 16, such, for example, as shown and described in my application for patent filed even date herewith.

Brackets 17 are secured to an intermediate portion of the frame and serve as mountings for a bell-crank-lever 18. The downwardly and rearwardly projecting arm of this lever is provided with pins 19 which project laterally from respective sides of said arm. On these pins, rollers 20 are mounted so as to be disposed under the plow beams and support the same when the base on one or the other beam is in working position. The upper arm of the bell-crank-lever 18 is bifurcated and in this bifurcated portion, an interiorly threaded sleeve 21 is pivotally supported. Brackets 22 are secured to the brace members 6 of the frame and between these brackets, a sleeve 23 is pivotally mounted and serves to support an adjusting shaft 24. The rear portion 25 of this shaft is threaded and passes through the threaded sleeve 21 on the bell-crank-lever, and the forward end of said shaft is provided with suitable manually operable means such as a crank handle 26.

It will be apparent that when a plow beam is in working position, it will be supported upon one of the rollers 20 on the bell-crank-lever, with the plow base penetrating the ground at the desired depth. By adjusting the bell-crank-lever, with the use of the shaft 24, the rollers 20 carried thereby may be raised or lowered and thus depth adjusting means are provided. When an elevated plow beam is released so as to permit it to assume working position, it will drop upon one of the rollers 20 and be supported thereby with its plow base penetrating the ground to the extent which the adjustment of the bell-crank-lever will permit. It will be observed that a single depth adjusting means, common to the two plow beams is provided and that when properly adjusted according to conditions which may be met, both plow bases will have the same depth of penetration, so that depth adjustment for the idle plow base will suffice also for the working plow base. The power lift and clutch mechanisms are not claimed specifically herein, the same being covered by my copending applications Serial Nos. 366,617 and 388,183 respectively.

Changes might be made in the details of my invention without departing from the spirit thereof or limiting its scope and hence I do not wish to restrict myself to the precise details herein set forth.

Having fully described my invention what I claim as new and desire to secure by Letters-Patent, is:—

1. The combination with the frame and independently vertically movable beams of a two-way plow, of a lever mounted on the frame and provided with parts at respective sides disposed under the respective beams and means for adjusting said lever.

2. The combination with the frame and independently vertically movable beams of a two-way plow, of a lever mounted on the frame, pins projecting from respective sides of said lever, rollers on said pins disposed under the respective beams, and means for adjusting said lever.

3. The combination with the frame and independently vertically movable beams of a two-way plow, of a bell-crank-lever mounted on the frame, parts projecting from respective sides of one arm of said lever and disposed under the respective beams, an internally threaded sleeve supported by the other arm of the bell-crank-lever, and a manually operable shaft supported by the frame and having a threaded part passing through said internally threaded sleeve.

In testimony whereof I have signed this specification in the presence of two subscribing witnesses.

RUDOLPH J. ALTGELT.

Witnesses:
OLIVE M. CULP,
BESSIE E. WOYAHN.